Patented Sept. 29, 1936

2,055,634

UNITED STATES PATENT OFFICE 2,055,634

PROCESS FOR PREPARING SYNTHETIC COLORING MATTER

Marvin M. Rosson, Los Angeles, Calif., and Egi V. Fasce, Baytown, Tex., assignors to Standard Oil Development Company, a corporation of Delaware No Drawing. Application November 19, 1931, Serial No. 576,216

10 Claims. (Cl. 260—168)

The present invention relates to a process for preparing coloring matter which is especially adapted for dyeing lubricating oils and will be fully understood from the following description:

The main object of this invention is to prepare solid or semi-solid coloring matter by the condensation of polycyclic aromatic hydrocarbons with themselves or with aromatic hydrocarbons.

Another object of the invention is the preparation of lubricating oils with a desirable green cast by the addition of small amounts of the coloring matter obtained by the process disclosed.

We have discovered that valuable condensation products may be obtained from polycyclic aromatic hydrocarbons such as anthracene, naphthalene, phenanthrene, etc., by treating a mixture of such hydrocarbons or a mixture of a polycyclic aromatic hydrocarbon with aromatic hydrocarbons such as benzene and its homologues, with anhydrous aluminum chloride for a certain length of time, hydrolyzing the mixture preferably with a weak acid solution, removing the aqueous layer and submitting the remaining reaction product to distillation if necessary in order to remove unreacted hydrocarbons. The treating in the presence of anhydrous aluminum chloride is preferably carried out at higher than room temperature, say above about 100° F., although lower temperatures may also be used if a sufficiently long time is given for the reaction. Ferric and zinc chlorides may also be used as condensing agents instead of the anhydrous aluminum chloride. Mechanical agitation is advantageously used since it promotes a uniform reaction. The reaction usually requires several hours for completion. The reaction product is then hydrolyzed by agitating with a dilute acid, say dilute hydrochloric acid, sulfuric acid, etc. for several hours. After the hydrolysis the aqueous layer is removed and the reaction product washed with water until free of acid. The hydrolysis step and the water wash remove the aluminum chloride and any hydrochloric acid formed during the reaction. After the water wash the product is dried by blowing with air at a temperature of say 200° F. The dried reaction product may serve for certain purposes as a raw dye stock or is preferably submitted to a distillation under vacuum, whereby any unreacted hydrocarbons may be separately condensed and the coloring matter by itself obtained as a fraction of the distillation.

The distilled coloring matter prepared by our method is solid at room temperature and is of hydrocarbon character in that it is not saponifiable. It may be used with special advantage for dyeing and giving a desirable green cast to lubricating oils. It also may be used for other purposes and its designation as dye stocks is not intended to be a limitation as to its possible usefulness.

The following examples will illustrate our process:

*Example 1.*—A mixture consisting of one part of anthracene, six parts of benzene and two-thirds part of aluminum chloride was refluxed with mechanical agitation for 5 hours at 110° F. The hydrolysis of the unreacted aluminum chloride was effected by the introduction of an equal volume of 6% HCl and agitating the mixture with air overnight in a warm water bath. The acid water layer was next drawn off and the residue remaining after the evaporation of the benzene was washed with water until free of acid and later dried by blowing with air at a temperature of 200° F. A reddish-brown solid residue was obtained with 10% yield, based on the reacting hydrocarbon raw material.

*Example 2.*—A mixture of one part of anthracene and four parts of xylene was heated to 120° F. and three-fourths part of aluminum chloride slowly added while the solution was being mechanically agitated. The contents were maintained at a temperature of 130° F. for four hours and then hydrolyzed with an equal amount of 6% hydrochloric acid. The solution was allowed to stand one hour before drawing off the acid layer. The oil layer was then given four 100% water washes and filtered. After removal of the xylene by distillation to 200° F., at 25 mm. of mercury absolute pressure, a net yield of 15% of crude dye was obtained based on the anthracene xylene mixture. The crude dye was a viscous semi-solid mass which was very soluble in benzene and slightly solid in naphtha. On vacuum distillation at 2 mm. absolute pressure it gave a 30% yield of an overhead cut of coloring matter which came over between 540–700° F. The distilled dyes were light to dark red solids which possessed intense dyeing properties.

*Example 3.*—Equimolecular quantities of anthracene and naphthalene were agitated in a molten state at 300° F., an equivalent amount (mol.) of aluminum chloride slowly added and the mixture heated at a temperature between 200–300° F., for 5 hours. The reaction product was dissolved in benzene and hydrolyzed with hydrochloric acid as in the case of the previous preparations. The acid layer was removed, the solution was given six 100% water washes and distilled under moderate vacuum to remove the unreacted naphthalene and anthracene. The bottoms were then distilled under 25 mm. absolute pressure and gave 6% yield of a distilled coloring matter which came over between 655–705° F. This coloring matter gave a superior olive green cast to lubricating oils when added in concentrations of 0.025–0.05%.

The following examples will illustrate the compositions obtained by adding the coloring matter to a lubricating oil and their test data as compared to the original lubricating oil to which no coloring matter was added:

|  | Lubricating oil obtained from petroleum oil by hydrogenation | Same lubricating oil plus 0.02% of coloring matter obtained from anthracene and naphthalene | Same lubricating oil plus 0.2% of coloring matter obtained from anthracene and naphthalene |
|---|---|---|---|
| Gravity °A. P. I | 27 | 26.9 | 26.9 |
| Vis. Saybolt at 100° F | 272 | 227 | 273 |
| Vis. Saybolt at 210° F | 493 | 495 | 495 |
| Viscosity index | 82 | 83 | 83 |
| Pour ° F | 20 | 15 | 15 |
| Cloud ° F | 14 | 16 | 18 |
| Flash ° F | 415 | 410 | 410 |
| Conradson car. percent | 0.026 | 0.027 | 0.046 |
| Color Robinson | 11 | 8½ | 1½ |

In the following claims the term "dissolved" which is applied to the compositions of lubricating oil and coloring matter is meant in the broad sense comprising both true solution and colloidal solution.

Our process is not to be limited by any theory or by the specific details given for the purpose of illustrating the invention but only by the following claims in which it is our intention to claim all novelty inherent in the process.

We claim:

1. The process of preparing a solid synthetic coloring matter, which comprises reacting at a temperature substantially not above 300° F. with anhydrous aluminum chloride upon a mixture containing as one component a polycyclic aromatic hydrocarbon and as the other component a hydrocarbon selected from the class consisting of aromatic hydrocarbons and polycyclic aromatic hydrocarbons other than the polycyclic aromatic hydrocarbon selected as the first component, removing the aluminum chloride, and separating the solid coloring matter from the reaction mixture.

2. The process of preparing a solid synthetic coloring matter, which comprises reacting at a temperature substantially not above 300° F. with anhydrous aluminum chloride upon a mixture containing as one component anthracene, and as the other component a hydrocarbon selected from the class consisting of benzene, xylene and naphthalene, removing the aluminum chloride, and separating the solid coloring matter from the reaction mixture.

3. Process according to claim 2 in which said other component is benzene.

4. The process according to claim 2 in which said other component is xylene.

5. The process according to claim 2 in which said other component is naphthalene.

6. The process of preparing a solid coloring matter, which comprises reacting at a temperature substantially not above 300° F. with anhydrous aluminum chloride upon a mixture consisting as one component of a polycyclic aromatic hydrocarbon and as the other component of a hydrocarbon selected from the class consisting of aromatic hydrocarbons and polycyclic aromatic hydrocarbons other than the polycyclic aromatic hydrocarbon selected as the first component, removing the aluminum chloride and separating the solid coloring matter from the reaction mixture.

7. The process of preparing a solid synthetic coloring matter, which comprises reacting at a temperature substantially not above 300° F. with anhydrous aluminum chloride upon a mixture consisting as one component of solid anthracene and as the other component a hydrocarbon selected from the class consisting of benzene, xylene and naphthalene, removing the aluminum chloride, and separating the solid coloring matter from the reaction mixture.

8. The process according to claim 7, in which said other component is solid naphthalene.

9. As a coloring matter capable of imparting fluorescence to mineral oils, a condensation product of a polycyclic aromatic hydrocarbon and a hydrocarbon selected from the class consisting of aromatic hydrocarbons and polycyclic aromatic hydrocarbons other than the polycyclic aromatic hydrocarbons selected as the first component, obtainable by condensation of these substances at a temperature substantially not above 300° F. in the presence of aluminium chloride.

10. As a coloring compound capable of imparting fluorescence to lubricating oils, a condensation product of anthracene and naphthalene, obtainable by condensation of these substances at a temperature not substantially above 300° F. in the presence of aluminium chloride.

MARVIN M. ROSSON.
EGI V. FASCE.